US007841490B2

(12) United States Patent
Rampini et al.

(10) Patent No.: US 7,841,490 B2
(45) Date of Patent: *Nov. 30, 2010

(54) MIXTURE OF LOW-BOILING LIQUIDS WITH PRODUCTS DISPENSABLE BY PUMPS

(75) Inventors: Gabriele Rampini, Milan (IT); Matteo Moretti, Crema (IT)

(73) Assignee: Lumson S.p.A., Capergnanica (CR) (IT)

( * ) Notice: Subject to any disclaimer, the term of this patent is extended or adjusted under 35 U.S.C. 154(b) by 625 days.

This patent is subject to a terminal disclaimer.

(21) Appl. No.: 10/580,025

(22) PCT Filed: Oct. 21, 2005

(86) PCT No.: PCT/EP2005/555466

§ 371 (c)(1), (2), (4) Date: May 19, 2006

(87) PCT Pub. No.: WO2006/081879

PCT Pub. Date: Aug. 10, 2006

(65) Prior Publication Data

US 2009/0039314 A1 Feb. 12, 2009

(30) Foreign Application Priority Data

Feb. 7, 2005 (IT) .......................... MI2005A0168

(51) Int. Cl.
*B65D 88/54* (2006.01)
*G01F 11/00* (2006.01)

(52) U.S. Cl. ................. 222/321.2; 222/321.9; 222/394; 252/182.12

(58) Field of Classification Search ............. 252/181.2; 424/45, 47; 222/321.4, 321.7, 1, 321.2, 385, 222/321.9, 263, 256, 321.1, 341, 386.5, 389, 222/373, 402.3, 37, 394, 402.2
See application file for complete search history.

(56) References Cited

U.S. PATENT DOCUMENTS 4,511,069 A 4/1985 Kalat
4,767,613 A * 8/1988 Nuber et al. .................. 424/47
5,206,009 A * 4/1993 Watling et al. ................ 424/45
5,804,166 A * 9/1998 Chan et al. .................... 424/47
2003/0150880 A1* 8/2003 Marelli .................... 222/321.7
2009/0039314 A1* 2/2009 Rampini et al. ........ 252/182.12

FOREIGN PATENT DOCUMENTS

GB 1 537 436 12/1978
JP 1537436 * 10/1977

* cited by examiner

*Primary Examiner*—Ling-Siu Choi
*Assistant Examiner*—Bijan Ahvazi
(74) *Attorney, Agent, or Firm*—Oblon, Spivak, McClelland, Maier & Neustadt, L.L.P.

(57) ABSTRACT

Fluid mixture which comprises at least one low-boiling liquid, and which during use generates a low vapour pressure, said mixture being dispensable by a manually operated dispensing pump mounted on a hermetically sealed container of this mixture. The low vapour pressure developed by the low-boiling liquid is such as to prevent a vacuum being created in the container interior when the mixture is dispensed by the pump, in order to allow correct pump operation.

16 Claims, No Drawings

MIXTURE OF LOW-BOILING LIQUIDS WITH PRODUCTS DISPENSABLE BY PUMPS

FIELD OF THE INVENTION

The present invention relates to mixtures of low-boiling liquids with products dispensable by pumps.

BACKGROUND OF THE INVENTION

It is known that many kinds of products in different physical forms are stored within containers from which they are delivered by pumps or valves.

Many types of manually operable pumps are known for externally dispensing, through the operating stem cavity, fluid substances (liquid or creamy) withdrawn from a container in which a pump is mounted; the hollow stem extends to the outside of the pump by passing through a hole provided in a flange forming part of the pump and bounding the pump at one end.

To prevent vacuum forming in the container interior when the fluid is withdrawn from the latter and dispensed by the pump, the pump must be provided with a passageway or aperture enabling atmospheric air to penetrate into the container in order to maintain therein an essentially constant pressure substantially equal to atmospheric pressure.

The passageway is formed between the outer surface of the pump hollow stem and the surface of the flange hole through which the stem passes: such a system presents two important drawbacks, one of which is that the external air which penetrates into the container can deteriorate the characteristics of the fluid substance contained therein, the other being the fact that this fluid can seep or escape to the outside of the container through said pump when the container and pump lie in a horizontal position or with the pump facing downwards from the container.

Another system to dispense the products is by a valve from an aerosol: the products are stored in sealed containers having an internal pressure which is rather high, obtained by the use of pressurized chlorofluorocarbon propellant (now banned) or by pressurized hydrocarbon propellants.

DESCRIPTION OF THE RELATED ART

U.S. Pat. No. 4,511,069 teaches the use of pressurized gases as propellants for delivering the products by a pump (and not by a valve, as it was usually done in the prior art), preventing to have delivery of gas in a continuous way or in great amounts in a short time, thereby avoiding the risks due to the use of the gas (which may be hazardous as to inflammability).

GB patent N. 1537436 teaches to provide a spraying device consisting of a pump mounted on an air-tight vessel in which the atmosphere is maintained at a low pressure by a pressurized gas (see page 1, lines 25, 30; page 2, lines 1, 5, 15, 25; page 3, lines 1, 5, 30; page 4, lines 15-20 and 35-40; page 5, line 1, page 6, line 20).

The use of a gas has the serious drawback that its introduction into a sealed vessel requires the same technologies as for any aerosol filling which are very clever and expensive. Moreover, the use of a gas within a sealed vessel implies the fact that the pressure within such vessel can undergo strong variations depending on the temperature changes which the vessel is exposed to: said pressure variations affect the functionality of the pump which can therefore deliver different doses of the product or even leak (as can be taken also from what stated from line 25 of column 12 to line 40 of column 13 of U.S. Pat. No. 4,511,069).

SUMMARY OF THE INVENTION

It is an object of the present invention to provide mixtures of products dispensable by a pump sealedly mounted on a container of the product, without making any use of propellant gases, while getting, however, the same favourable performances which are presently obtained only by aerosol dispensing systems.

Another object is to enable very cheap and simple technologies for filling the sealed containers with the products to be dispensed.

Pumps suitable to be used on the sealed container are, for example, disclosed in EP-A-0086144; U.S. Pat. No. 3,221,346; GB-A-1537436 and U.S. Pat. No. 4,511,609 whose teachings are herewith incorporated by reference.

The objects of the present invention are attained by a mixture of products dispensable by pumps sealedly mounted on containers of such products, characterized in that such mixture comprises at least one low-boiling liquid having a saturated vapour pressure less than 1.00 kg/cm$^2$ at 15° C. and less than 2.8 kg/cm$^2$ at 37.8° C.

Such low boiling liquids within the closed containers develop a low pressure on whose value the temperature changes have a low influence, thus having no affect on the pump functionality.

Low-boiling liquids are considered to be all those products which at 15° C. possess or develop a vapour pressure less than 1.00 kg/cm$^2$ according to the definition given in the GAS Encyclopaedia by Louis Neel (Nobel prize for physics, published by AIR LIQUIDE), and which develop pressures less than 2.8 kg/cm$^2$ at 37.8° C. (IATA regulations for air transport, Section X, Explanation of Articles and Terminology): low boiling liquids are products which have a boiling point ranging between +15° and 85° C. at ambient pressure (about 760 mm/Hg).

Very volatile mixtures (hereinafter known as "VVFs" for short) are obtained by mixing the basic products (active products plus possible additives and base support products etc.) with the said low-boiling liquids in proportions varying from a minimum of 3% to a maximum of 97% by weight which, proportionally to their quantity in the mixture, increase the evaporation rate of the more high-boiling products of the basic mixture, in order to give the dispensed form of the desired characteristics.

Such low-boiling liquids, either pure or in mixture, may be of various chemical types, which may be mutually miscible or immiscible, flammable or non-flammable and chemically inert (non-reactive) towards the basic formulation, to comply with current toxicity, transport, ecological and other regulations.

The chemical classes (especially aliphatic chemicals) of said low-boiling liquids are those allowable by current toxicity, ecological, transport and other regulations determined for the goods sector by local or national communities or bodies.

Some of these are indicated below.

Those mostly used for cost and availability reasons are:

hydrocarbon isomers: isopentane, isohexane;

linear hydrocarbons: n-pentane, n-hexane;

chlorinated hydrocarbons: dichloro-methane, mono-chloro-propane, 1-1-dichloro-ethane, 2-chlorobutane;

chloro-fluorinated hydrocarbons: trichloro-fluoro-methane CFC 11, trichloro-tifluoro-ethane CFC 113;

alcohols: ethyl alcohol, isopropyl alcohol;

ethers: ethyl ether;

di-ethers: methylene-dimethylether, dimethoxy-methane;

ketones: acetone.

The said VVFs formulations (liquids or semi-solids) can be in various physical states (e.g. solutions, emulsions, suspensions, colloids, gels, foams, etc.) with different viscosities and densities and, as stated, with moderate vapour pressure and high volatility (evaporation) features.

The low vapour pressure developed by said low-boiling liquids is such as to prevent a vacuum forming within the container when the mixture is dispensed by the pump, in order both to compensate the volume of product dispensed by the pump and to rebalance the pressure inside the container.

At 54.4° C. these VVFs must not develop a pressure exceeding 2.80 kg/cm$^2$, at different temperatures they developing proportionally different pressures.

The mixture of the present invention uses normal commercially available containers of common material sufficiently rigid to withstand the pressure developed therein by the product, these containers being connected hermetically to the said hermetic pump by closures of known type, using screwing, seam-joining, rolling, clinching or other systems, such as plastic, glass or metal bottles, containers of aerosol type in similar materials, etc.

The VVFs mixed with the low-boiling liquids according to the invention can be used in various sectors, such as the cosmetics, domestic, insecticide, pesticide, phytopharmaceutical, pharmaceutical, technical and other sectors.

DESCRIPTION OF THE INVENTION

Some non-limiting examples of implementation of the invention will now be described illustrating VVF mixtures dispensable in atomized form through the nozzle or in foam or cream form through the spout or tube of a dispenser knob of said hermetic pump.

In the examples all the indicated percentages are by weight on the total weight of the VVFs fluid mixtures.

EXAMPLE 1

45% of isopentane or 15% of dimethoxymethane plus 35% of isopentane are added to the normal composition of a mixture having deodorant and perfuming properties.

EXAMPLE 2

25% of isopentane (is the formulation is dispensed in atomized form) or 15% of dimethoxymethane plus 25% of isopentane (if the formulation is in the form of a foam or a cream) are added to the normal composition of a hair spray.

EXAMPLE 3

A hair shining spray of usual composition can be mixed with 45% of isopentane 6K or 15% of dimethoxymethane plus 45% of isopentane.

EXAMPLE 4

20% of isopentane is added to the known composition of a shaving cream or gel dispensable by a pump. In the same manner fluid mixtures for topical cosmetic use can be obtained, such as body and face creams, sun products, etc.

EXAMPLE 5

A mousse (usable for supporting various active principles) for hands and body can be obtained by mixing 20% of isopentane with a known composition for this purpose.

EXAMPLE 6

A fixing mousse for hair can be obtained by mixing 15% of isopentane with a known mixture for this purpose.

EXAMPLE 7

A fluid mixture dispensable by a pump from a hermetically sealed environment can be obtained by mixing 45% of isopentane, or 15% of dimethoxymethane plus 30% of isopentane, with a sun spray mixture of known type.

EXAMPLE 8

A spray perfume of known type can be mixed with 40% of isopentane.

EXAMPLE 9

A deodorant fluid mixture can be obtained by mixing 75% of isopentane or 10% of dimethoxymethane plus 50% of isopentane plus 20% of pure acetone with a known mixture usable to give a spray having the desired characteristics.

EXAMPLE 10

A fluid mixture usable for its antistatic properties which enable it not to retain dust is obtained from a similar known composition by adding 5% of pure acetone and 20% of dimethoxymethane.

EXAMPLE 11

A composition usable for forming a disinfectant and anaesthetic skin bandage is obtained by mixing 15% of pure acetone plus 35% of isopentane or 15% of dimethoxymethane plus 35% of isopentane with a similar mixture of known composition.

EXAMPLE 12

A fluid composition with revulsive skin soothing properties can be obtained by mixing 45% of isopentane, or 15% of dimethoxymethane plus 35% of isopentane, with a known mixture having these properties

EXAMPLE 13

A fluid mixture with anaesthetic coolant properties can be obtained from similar known mixtures by adding 10% of isopentane and 10% of dimethoxymethane.

EXAMPLE 14

A fluid mixture with silicone polishing properties for automobile interiors can be obtained by mixing 25% of isopentane or dimethoxymethane with a known composition possessing these properties.

EXAMPLE 15

A fluid mixture usable for cleaning spectacle lenses can be obtained by mixing 25% of dimethoxymethane with a known composition possessing these properties.

EXAMPLE 16

A fluid mixture with deicing properties can be obtained by mixing 30% of dimethoxymethane with a similar known composition possessing these properties.

EXAMPLE 17

A loosening penetrating spray can contain 45% of dimethoxymethane or 10% of dimethoxymethane plus 35% of isopentane, added to the common known compositions of a loosening spray (for example for loosening bolts).

EXAMPLE 18

A black spray usable on vehicle tyres can be obtained by mixing 35% of dimethoxymethane with the common compositions of sprays used for this purpose.

The fluid mixtures of the present invention, of which some embodiments have been described heretofore, can be prepared, bottled and conditioned by normal plants commonly used for preparing and packaging aerosol products of known type without any need for modifying the plant.

The invention claimed is:

1. A fluid dispensing container, comprising:

a dispensing pump sealedly mounted on the container;

a fluid product to be dispensed by the dispensing pump; and at least one low-boiling liquid;

wherein a percent by weight of the at least one low-boiling liquid is from 3% to 97% by weight of a total weight of the at least one low-boiling liquid and the fluid product, the fluid dispensing container does not comprise a pressurized gas, the at least one low-boiling liquid has a boiling point in the range from 15° C. to 85° C. at 760 mm Hg, and a vapor pressure of the at least one low boiling liquid is less than 1 $Kg/cm^2$ at 15° C. and less than 2.8 $Kg/cm^2$ at 37.8° C.

2. The fluid dispensing container according to claim 1, wherein the at least one low-boiling liquid is at least one selected from the group consisting of isopentane, isohexane, n-pentane, n-hexane, dichloromethane, monochloro propane, 1,1-dichloroethane, 2-chlorobutane, trichloro-fluoromethane CFC 11, trichloro-trifluoro-ethane CFC 113, ethyl ether, methylene-dimethyl ether, dimethoxymethane and acetone.

3. A process for preparing the fluid dispensing container according to claim 1, comprising:

charging to the container the fluid product to be dispensed by the pump and the at least one low-boiling liquid;

mounting the dispensing pump on the charged container; and sealing the dispensing pump on the charged container;

wherein the fluid dispensing container is prepared without any use of pressurized gases.

4. The process according to claim 3, wherein the at least one low-boiling liquid is at least one selected from the group consisting of isopentane, isohexane, n-pentane, n-hexane, dichloromethane, monochloro propane, 1,1-dichloroethane, 2-chlorobutane, trichloro-fluoromethane CFC 11, trichloro-trifluoro-ethane CFC 113, ethyl ether, methylene-dimethyl ether, dimethoxymethane and acetone.

5. A fluid dispensing container, consisting essentially of:

a dispensing pump sealedly mounted on the container; and a fluid mixture;

wherein the fluid dispensing container does not comprise a pressurized gas, the fluid mixture comprises:

active products;

at least one low-boiling liquid having a boiling point in the range from 15° C. to 85° C. at 760 mm Hg, and a vapor pressure of less than 1 $Kg/cm^2$ at 15° C. and less than 2.8 $Kg/cm^2$ at 37.8° C.;

optional additives; and optional base support products; and a vapor pressure of the fluid mixture is 2.80 $kg/cm^2$ or less at 54.4° C.

6. The fluid dispensing container according to claim 5, wherein the at least one low-boiling liquid is at least one selected from the group consisting of isopentane, isohexane, n-pentane, n-hexane, dichloromethane, monochloro propane, 1,1-dichloroethane, 2-chlorobutane, trichloro-fluoromethane CFC 11, trichloro-trifluoro-ethane CFC 113, ethyl ether, methylene-dimethyl ether, dimethoxymethane and acetone.

7. The fluid dispensing container according to claim 5, wherein a proportion of the low-boiling liquid is from 3% to 97% by weight of a total weight of the active products, at least one low-boiling liquid, optional additives and optional base support products.

8. A process for preparing the fluid dispensing container according to claim 5, comprising:

charging to the container the fluid product to be dispensed by the pump, optional additives, optional base support products and the at least one low-boiling liquid;

mounting the dispensing pump on the charged container; and sealing the dispensing pump on the charged container;

wherein the fluid dispensing container is prepared without any use of pressurized gases.

9. A fluid dispensing container, consisting of:

a dispensing pump sealedly mounted on the container;

active products;

at least one low-boiling liquid having a boiling point in the range from 15° C. to 85° C. at 760 mm Hg, and a vapor pressure of less than 1 $Kg/cm^2$ at 15° C. and less than 2.8 $Kg/cm^2$ at 37.8° C.;

optional additives; and optional base support products;

wherein the fluid dispensing container does not comprise a pressurized gas, and a vapor pressure of the fluid mixture is 2.80 $kg/cm^2$ or less at 54.4° C.

10. The fluid dispensing container according to claim 9, wherein the at least one low-boiling liquid is at least one selected from the group consisting of isopentane, isohexane, n-pentane, n-hexane, dichloromethane, monochloro propane, 1,1-dichloroethane, 2-chlorobutane, trichloro-fluoromethane CFC 11, trichloro-trifluoro-ethane CFC 113, ethyl ether, methylene-dimethyl ether, dimethoxymethane and acetone.

11. The fluid dispensing container according to claim 9, wherein a proportion of the low-boiling liquid is from 3% to 97% by weight of a total weight of the active products, at least one low-boiling liquid, optional additives and optional base support products.

12. A process for preparing the fluid dispensing container according to claim 9, comprising:

charging to the container the fluid product to be dispensed by the pump, optional additives, optional base support products and the at least one low-boiling liquid;

mounting the dispensing pump on the charged container; and sealing the dispensing pump on the charged container;

wherein the at least one low-boiling liquid has a boiling point in the range from 15° C. to 85° C. at 760 mm Hg, and a vapor pressure of less than 1 $Kg/cm^2$ at 15° C. and less than 2.8 $Kg/cm^2$ at 37.8° C., and the fluid dispensing container is prepared without any use of pressurized gases.

13. A fluid dispensing container, comprising:

a dispensing pump sealedly mounted on the container;

a fluid product to be dispensed by the dispensing pump; and at least one low-boiling liquid;

wherein no component having a boiling point less than 15° C. at 760 mm Hg is present, the fluid dispensing container does not comprise a pressurized gas, a vapor pressure of the at least one low boiling liquid is less than 1 $Kg/cm^2$ at 15° C. and less than 2.8 $Kg/cm^2$ at 37.8° C., and a vapor pressure within the fluid dispensing container is 2.80 $kg/cm^2$ or less at 54.4° C.

14. The fluid dispensing container according to claim 13, wherein the at least one low-boiling liquid is at least one selected from the group consisting of isopentane, isohexane, n-pentane, n-hexane, dichloromethane, monochloro propane, 1,1-dichloroethane, 2-chlorobutane, trichloro-fluoromethane CFC 11, trichloro-trifluoro-ethane CFC 113, ethyl ether, methylene-dimethyl ether, dimethoxymethane and acetone.

15. The fluid dispensing container according to claim 13, wherein a proportion of the low-boiling liquid is from 3% to 97% by weight of a total weight of the active products, at least one low-boiling liquid, optional additives and optional base support products.

16. A process for preparing the fluid dispensing container according to claim 13, comprising:

charging to the container the fluid product to be dispensed by the pump and the at least one low-boiling liquid;

mounting the dispensing pump on the charged container; and sealing the dispensing pump on the charged container;

wherein the fluid dispensing container is prepared without any use of pressurized gases, no component having a boiling point less than 15° C. at 760 mm Hg is charged, and a vapor pressure of the at least one low boiling liquid is less than 1 $Kg/cm^2$ at 15° C. and less than 2.8 $Kg/cm^2$ at 37.8° C.

* * * * *

UNITED STATES PATENT AND TRADEMARK OFFICE

CERTIFICATE OF CORRECTION

PATENT NO. : 7,841,490 B2
APPLICATION NO. : 10/580025
DATED : November 30, 2010
INVENTOR(S) : Gabriele Rampini et al.

It is certified that error appears in the above-identified patent and that said Letters Patent is hereby corrected as shown below:

On the title page, Item (86), the PCT No. is incorrect. Item (86) should read:

-- (86) PCT No.: PCT/EP2005/055466

§ 371 (c)(1),
(2), (4) Date: May 19, 2006 --

Signed and Sealed this
First Day of February, 2011

David J. Kappos
*Director of the United States Patent and Trademark Office*